(12) United States Patent
Holson

(10) Patent No.: US 11,878,427 B2
(45) Date of Patent: *Jan. 23, 2024

(54) ROBOT NAVIGATION USING 2D AND 3D PATH PLANNING

(71) Applicant: Google LLC, Mountain View, CA (US)

(72) Inventor: Benjamin Holson, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/068,100

(22) Filed: Dec. 19, 2022

(65) Prior Publication Data

US 2023/0123298 A1 Apr. 20, 2023

Related U.S. Application Data

(63) Continuation of application No. 17/156,844, filed on Jan. 25, 2021, now Pat. No. 11,554,488, which is a continuation of application No. 15/967,805, filed on May 1, 2018, now Pat. No. 10,899,006.

(51) Int. Cl.
*B25J 9/16* (2006.01)

(52) U.S. Cl.
CPC ........... *B25J 9/1666* (2013.01); *B25J 9/1671* (2013.01); *B25J 9/1697* (2013.01); *Y10S 901/01* (2013.01); *Y10S 901/07* (2013.01); *Y10S 901/09* (2013.01)

(58) Field of Classification Search
CPC ...... B25J 9/1666; B25J 9/1671; B25J 9/1697; Y10S 901/01; Y10S 901/09; Y10S 901/47
See application file for complete search history.

(56) References Cited

U.S. PATENT DOCUMENTS

| | | | |
|---|---|---|---|
| 5,758,298 A | 5/1998 | Guldner | |
| 5,835,684 A | 11/1998 | Bourne et al. | |
| 7,092,862 B2 | 8/2006 | Hooks | |
| 2005/0182518 A1 | 8/2005 | Karlsson | |
| 2007/0168309 A1 | 7/2007 | Tzruya et al. | |
| 2007/0193798 A1 | 8/2007 | Allard et al. | |
| 2009/0058856 A1 | 3/2009 | Kuroda et al. | |
| 2010/0235033 A1* | 9/2010 | Yamamoto | G05D 1/024 701/26 |
| 2012/0215380 A1* | 8/2012 | Fouillade | G05D 1/0044 701/2 |
| 2013/0013113 A1* | 1/2013 | Choi | B25J 9/1664 700/262 |

(Continued)

OTHER PUBLICATIONS

Baudouin et al., "Real-time Replanning Using 3D Environment for Humanoid Robot," IEEE-RAS International Conference on Humanoid Robots, Oct. 2011, 7 pages.

(Continued)

*Primary Examiner* — Harry Y Oh
(74) *Attorney, Agent, or Firm* — McDonnell Boehnen Hulbert & Berghoff LLP

(57) ABSTRACT

Methods, systems, and apparatus, including computer-readable storage devices, for robot navigation using 2D and 3D path planning. In the disclosed method, a robot accesses map data indicating two-dimensional layout of objects in a space and evaluates candidate paths for the robot to traverse. In response to determining that the candidate paths do not include a collision-free path across the space for a two-dimensional profile of the robot, the robot evaluates a three-dimensional shape of the robot with respect to a three-dimensional shape of an object in the space. Based on the evaluation of the three-dimensional shapes, the robot determines a collision-free path to traverse through the space.

20 Claims, 5 Drawing Sheets

(56) References Cited

U.S. PATENT DOCUMENTS

| | | | |
|---|---|---|---|
| 2014/0350839 | A1 | 11/2014 | Pack et al. |
| 2015/0314443 | A1 | 11/2015 | Yu |
| 2017/0116487 | A1 | 4/2017 | Yamazaki et al. |
| 2017/0314930 | A1 | 11/2017 | Monterroza et al. |
| 2017/0348856 | A1* | 12/2017 | Nakaya .................. B25J 9/1666 |
| 2018/0267561 | A1 | 9/2018 | Trench et al. |
| 2019/0337154 | A1 | 11/2019 | Holson |
| 2020/0019164 | A1 | 1/2020 | Li et al. |

OTHER PUBLICATIONS

Gochev et al., "Path Planning with Adaptive Dimensionality," Fourth Annual Symposium On Combinatorial Search, Jul. 2011, pp. 52-59.

Gupta et al., "Cognitive Mapping and Planning for Visual Navigation," IEEE Conference on Computer Vision and Pattern Recognition, Jul. 21-26, 2017, 10 pages.

International Searching Authority, International Search Report and Written Opinion dated Nov. 25, 2019, issued in connection with International Patent Application No. PCT/US2019/028868, 14 pages.

International Searching Authority, Preliminary Report on Patentability dated Nov. 3, 2020, issued in connection with International Patent Application No. PCT/US2019/028868, 8 pages.

Thrun et al., "A Real-Time Algorithm for Mobile Robot Mapping with Application to Multi-Robots and 3D Mapping," IEEE International Conference on Robotics and Automation, Apr. 24-28, 2000, 8 pages.

Wulf et al., "Colored 2D Maps for Robot Navigation with 3D Sensor Data," IEEE/RSJ International on.

\* cited by examiner

2D Planner: Maximum Robot Profile

2D Planner: Minimum Robot Profile

3D Planner: 3D Profile

Selected Path

ROBOT NAVIGATION USING 2D AND 3D PATH PLANNING

CROSS REFERENCE TO RELATED APPLICATIONS

This application is a continuation application of U.S. application Ser. No. 17/156,844, filed Jan. 25, 2021, which is a continuation of U.S. application Ser. No. 15/967,805, filed May 1, 2018, each of which are incorporated herein by reference in their entirety.

TECHNICAL FIELD

This disclosure relates generally to robot navigation.

BACKGROUND

As robots move about a space, they may need to navigate around obstacles and objects in their environment.

SUMMARY

A robot can dynamically switch between two-dimensional (2D) path planning and three-dimensional (3D) path planning based on conditions encountered. For example, the robot can use a 2D path planner most of the time for computational efficiency. The robot's 2D planner can use a 2D occupancy grid, similar to a floor plan, to map positions of objects in a space. The 2D planner further uses a 2D profile of the robot, e.g., a projection of the robot onto the plane of the floor, to determine whether there is a collision-free path for the robot around the objects in the space. If the robot identifies a collision-free path using the 2D occupancy grid, the robot can safely navigate using the 2D technique while avoiding the higher computational demands of 3D analysis of potential obstacles.

If the robot is unable to identify a collision-free path using 2D analysis, the robot may temporarily switch to 3D path planning to perform a more fine-grained assessment whether a collision-free path exists. The 3D techniques use more computational resources, but allow the robot to more accurately evaluate its ability to navigate confined spaces. The robot can detect specific scenarios or path segments where 3D path planning is used. This includes detecting when a maximum 2D profile of the robot (e.g., indicating the maximum width of the robot) does not fit through an area, but a minimum 2D profile of the robot (e.g., indicating a minimum width of the robot) does fit through the area. This analysis can conserve power and computation resources by using 3D path planning only when a potential path exists. If even the minimum dimensions of the robot do not fit through an area, unnecessary computation for 3D path planning is avoided when the 2D path planning shows no possible path exists.

The use of complementary 2D and 3D path planning increases the capability of the robot to navigate complex environments while maintaining efficiency. For example, for a round table in a room, the entire area of the table top would be shown as blocked in a 2D occupancy grid. However, the base of the table may be significantly narrower than the table top, narrow enough for the robot to pass by while a portion of the robot extends slightly under or over the table top. The 3D analysis compares the vertical profile of the robot with the vertical profile of the table to determine whether the robot can safely pass without colliding with the table. In addition, the 3D analysis can also determine how to change the pose of the robot, e.g., to raise or lower a robot arm or other component, to change the vertical profile of the robot and provide clearance in the narrow space.

In some implementations, the method is performed by a robot and includes (i) accessing, by the robot, map data indicating a 2D layout of objects in a space; (ii) evaluating, by the robot, candidate paths for the robot to traverse the space based on the map data; (iii) determining, by the robot, that the candidate paths do not include a collision-free path across the space for a 2D profile of the robot; (iv) in response to the determination, evaluating, by the robot, a three-dimensional shape of the robot with respect to a 3D shape of an object in the space; and (v) determining, by the robot, a path based on evaluating the 3D shape of the robot with respect to the 3D shape of an object in the space.

In some implementations, the 2D profile of the robot is a minimum 2D profile of the robot.

In some implementations, the method includes evaluating candidate paths for the robot to traverse the space based on the map data by determining, by the robot, a location of an object in the space and an area occupied by the object and generating, by the robot, a path segment for the robot to traverse, wherein the path segment does not intersect the area occupied by the object. In some implementations, the robot can determine that the candidate paths do not include a collision-free path across the space for a 2D profile of the robot by (i) generating a 2D area along the path segment by tracing a 2D profile of the robot along a length of the path segment and (ii) determining that the area along the path segment intersects the area occupied by the object.

In some implementations, the 3D shape of the robot is a first 3D shape corresponding to a first configuration of the robot, and determining a path based on evaluating the 3D shape of the robot with respect to the 3D shape of an object in the space includes (i) based on evaluating the first 3D shape of the robot with respect to the 3D shape of an object in the space, determining, by the robot, that the first 3D shape of the robot intersects the 3D shape of the object, and (ii) in response to the determination, determining a path based on evaluating, by the robot, a second 3D shape of the robot with respect to the 3D shape of the object, the second 3D shape of the robot corresponding to a second configuration of the robot.

In some implementations, accessing map data indicating a 2D layout of objects in a space includes receiving, by the robot, map data from a server over a communication network.

In some implementations, evaluating candidate paths for the robot to traverse the space based on the map data includes evaluating, by the robot, more than one candidate path for the robot to traverse the space. In such implementations, the robot can determine that the candidate paths do not include a collision-free path across the space for a 2D profile of the robot by determining that none of the more than one candidate path include a collision-free path across the space.

In some implementations, the described methods and operations can be performed by a robot. In some implementations, one or more non-transitory computer-readable media can store instructions that, when executed by one or more computers, cause the one or more computers to perform the described operations.

Certain implementations of the disclosed systems and techniques may have particular advantages. By pairing 2D and 3D path planning, the robot can reduce its computational load while still ensuring that it will identify a collision-free path if one exists. Reducing the computational demand conserves battery power and frees processing capability for other tasks.

By navigating primarily using 2D path planning, a robot can leverage the computational efficiency of 2D analysis techniques when navigating open spaces. Additionally, the efficiency of 2D analysis allows high refresh rates and high responsiveness by the robot. Thus, the 2D path planning system can perform analysis cycles that more quickly adjust to changing positions of obstacles and more quickly alter the course of the robot. With higher responsiveness and quicker planning, the robot may be able to move at a greater speed while dynamically adjusting its path to account for obstacles. By switching to 3D path planning when no collision-free path is identified by the 2D planning, the robot can leverage the accuracy of 3D analysis to navigate through confined spaces. The 3D analysis also increases the range of options for navigation, allowing the robot to plan paths that would have appeared blocked by 2D analysis alone.

The details of one or more implementations are set forth in the accompanying drawings and the description below. Other potential features and advantages of the disclosure will be apparent from the description, the drawings, and the claims.

BRIEF DESCRIPTION OF THE DRAWINGS

Like reference numbers and designations in the various drawings indicate like elements.

DETAILED DESCRIPTION

Figure 1:
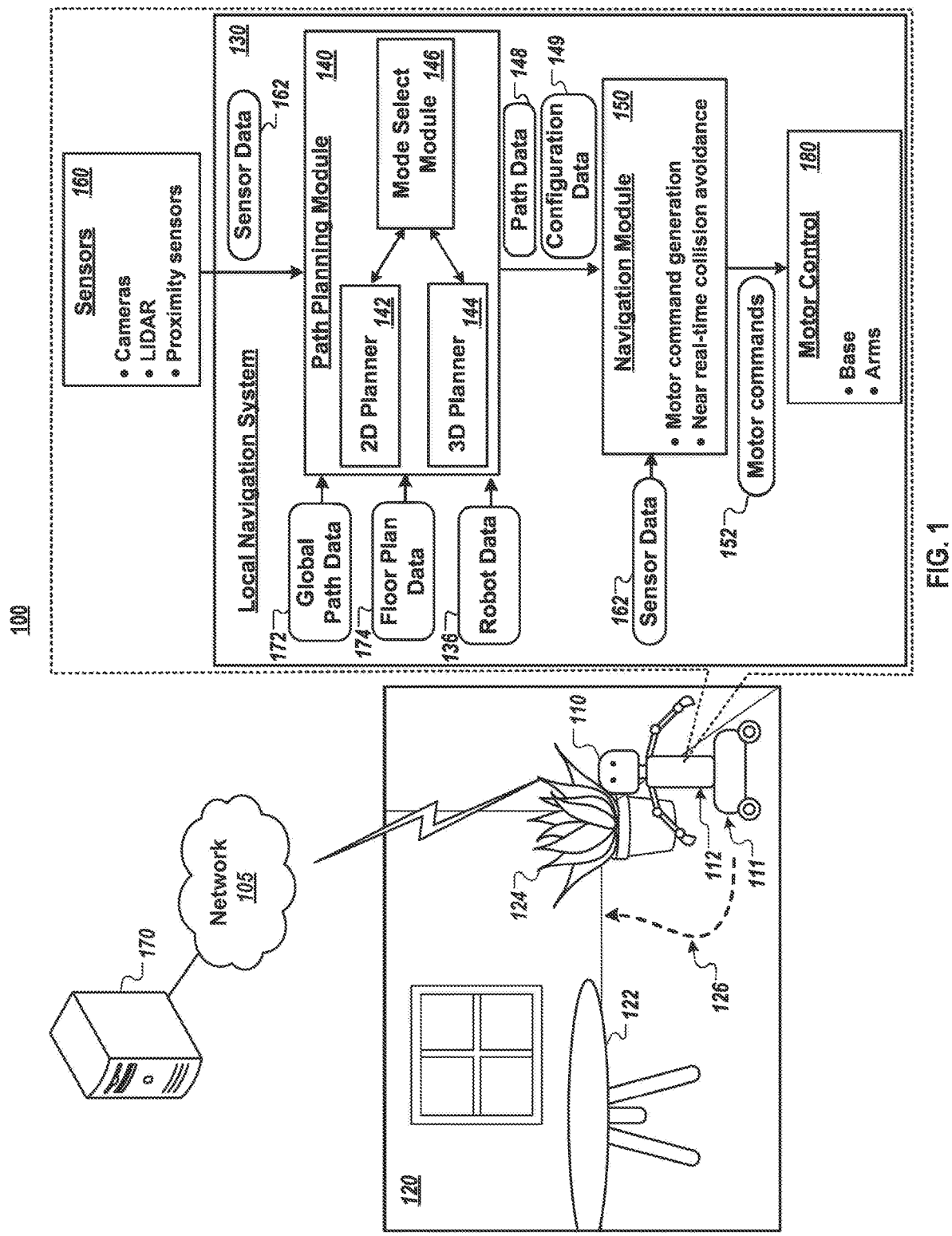
FIG. 1 is a diagram illustrating an example of a system for local robot navigation using 2D and 3D path planning.

FIG. 1 is a diagram illustrating an example of a system 100 for local robot navigation using 2D and 3D path planning. The system 100 includes a robot 110, which has a local navigation system 130 that includes a path planning module 140 and a navigation module 150. The robot 110 also includes sensors 160. The system 100 also includes a server 170 which communicates with the robot 110 over a network 105. FIG. 1 shows the robot 110 in a room 120 that includes a table 122 and a plant 124. In the example, the robot 110 attempts to navigate across the room 120, finding a path between the table 122 and the plant 124.

In general, a robot refers to a machine or apparatus that includes a computing device and a capability to move through an environment or manipulate objects in the environment. A robot typically has a locomotion system, such as motorized legs, wheels, or treads, that enable the robot to travel through its surroundings. The actions and functions of the robot can be controlled by one or more programmable embedded or external computing systems, which enable the robot to autonomously or semi-autonomously determine and perform actions, including navigation and locomotion, without input, or with only limited input, from a human user.

Many applications require a robot to move through a space to perform various tasks and actions. Navigating through a space that includes various obstacles or objects can be performed using a multistage process involving both global and local path planning phases to chart a collision-free path for the robot. In many instances, global and local path planning represent setting a path using information at different levels of specificity. For example, a global path plan may represent a high-level description of a route for a robot to travel, e.g., a plan to travel from one room to another through a doorway. Some or all of the global path plan may be generated based on data for regions that the robot does not currently observe with its sensors. By contrast, a local path plan may implement the global plan in a more fine-grained way, e.g., directing specific positions or waypoints within a room or setting course corrections to respond to detected obstacles. In this manner, the local path plan can implement and dynamically refine the global path plan as the robot travels, to fit the specific conditions the robot encounters.

In global path planning, the robot determines an initial, preferred global path to a desired destination based on information that does not change frequently, such as the structure of a building. Locations of previously observed objects, such as furniture that is consistently in a certain position, can also be used. The global path planning often involves setting a general route through areas that the robot does not currently observe with its sensors, and so the robot may not be able to verify the specific obstacles along the route. For example, the robot may use the known floor plan of a building to determine an initial, preferred path from a room on the first floor of the building, through a corridor, up an elevator, and around a corner to a room on the second floor of the building. Because the building's layout is known and unchanging, in global path planning, the robot can use this information to chart a global path that avoids known, static obstacles, such as walls. The robot can select the preferred global path based on any of various criteria, for instance, a path with the shortest distance, the fastest predicted transit time, or the path least likely to disrupt other occupants of the building.

In some implementations, the robot 110 may use 2D floor plan data to determine the global path. In some examples, the floor plan data is mapped to a 2D occupancy grid, which depicts the position of known obstacles (e.g., walls, stairwells, elevators, furniture) in the space. A typical global occupancy grid may have grid spacing on the order of 0.1 meters to 1 meter, where the grid spaces corresponding to obstacles or objects are considered occupied and thus impassable by the robot. Typically, the floor plan or the occupancy grid depicts a projection of obstacles or objects down onto the plane of the floor. As a result, the grid shows as occupied an area corresponding to the largest span of an object along the plane of the floor. For example, for a table depicted in an occupancy grid, an area corresponding to the entire table top will be indicated as occupied and impassable by the robot 110.

The robot 110 determines the preferred global path by charting a route from the robot's current location (e.g., the starting point) to its destination through the unoccupied regions of the global occupancy grid. For global path planning, to ensure that no part of the robot 110 collides with a known obstacle, the robot 110 may use a 2D profile to represent the robot's overall footprint (e.g., the projection of the shape of the robot 110 onto the plane of the floor) and chart a route along which the robot's 2D profile does not intersect with any occupied grid space.

The robot 110 may periodically update the preferred global path to account for deviations in the robot's location from the route. Because the information used for global path planning does not change frequently, the robot's global path may be updated on relatively slow time scales, e.g. once every few seconds (corresponding to update rates ranging from a fraction of one Hz to one Hz) or in response to a change in a map, floor plan, or occupancy grid. Global path planning can be performed by a computer system embedded in the robot 110 or by a remote computer system, e.g., by a server that periodically sends global path updates to the robot 110, or by a combination of local and remote processing.

Because global path planning uses static information such as a floor plan and/or previous observations that may not be current, the selected global path may not account for obstacles that are currently located along the path, but which were not present when the floor plan was generated. For example, the floor plan may not indicate the current location of a chair, or other item of furniture, that has been moved to a location that coincides with the route. The floor plan also is unlikely to indicate the presence of a person who is currently standing along the route.

To account for the differences between the information used to generate the global path and the current, actual state of the robot's environment, the robot can implement local path planning to modify the global route to avoid collisions. In local path planning, the robot uses current data from sensors of the robot (e.g., cameras, LIDAR, radar) to detect and locate obstacles along its route. If an obstacle is detected along the planned global path and the robot predicts that following the route could result in a collision with the obstacle, the robot can modify its path to avoid the collision. In this way, the local path planning enables the robot 110 to implement the planned global path, allowing for deviations from the planned global path to fit the situation encountered by the robot 110.

For example, the robot 110 may divide the global path into several path segments. Based on sensor data, if the robot 110 determines that the next path segment of the preferred global path is blocked by a chair, the robot 110 may replace that path segment with a new path segment that re-routes the robot 110 around the chair to avoid collision.

Generally, the robot's local path planning attempts to follow the global path, modifying the route only if it determines there may be a collision. Because it typically relies on sensing objects in the nearby environment, local path planning is generally performed for path segments in the local vicinity of the robot 110 (e.g., those path segments within a few meters of the robot 110).

As the robot 110 travels along its path, it performs local path planning for each subsequent path segment, detecting potential collisions with obstacles and modifying a particular part of the robot's route, if necessary, to avoid a collision. Because the robot's nearby surroundings change as the robot moves, local path planning is typically repeated at higher rates (e.g., on the order of 10 Hz or more), and requires lower latencies, than global path updates. As a result, local path planning is typically implemented in a computer system embedded as part of the robot 110.

To detect and avoid potential collisions, the robot 110 can use 2D or 3D analysis techniques. The 2D analysis techniques used for local path planning can be similar to the techniques used for global path planning. For example, the robot 110 can generate a local 2D occupancy grid based on its sensed surroundings and use a 2D profile that represents the footprint of the robot 110. In some cases, the same occupancy grid used for global path planning can be used for local path planning. In other cases, because the robot 110 uses current sensor data to generate or update the local occupancy grid, it may have a grid spacing on the order of a few centimeters, smaller than that of the global occupancy grid. If, when moving the robot 110 profile along the proposed path segment, the profile intersects a blocked space of the local occupancy grid, the robot may identify a potential collision. If the robot 110 identifies a potential collision along a segment of the global path, it can attempt to reroute the robot 110 around the obstacle, but still generally in the direction of the global path.

While the 2D techniques described above can be computationally efficient, in some examples, they may fail to identify a collision-free path, even though one exists. This can occur due to the approximations used in 2D path planning, especially since the maximum dimensions of an object are projected onto the occupancy grid. For example, the global path may direct the robot 110 to pass between a table and a plant or other object. In the local occupancy grid, the entire area of the table top, as well as the largest extent of the plant, would be shown as occupied. A 2D analysis using a 2D profile of the robot 110 that represents the largest diameter of the robot, may indicate that the robot 110 cannot pass through the space between the table and the plant without contacting one or the other. The 2D analysis would thus conclude that there is no collision-free route along the global path. However, if the base of the table is significantly narrower than the table top, as is typical, the robot 110 may be able to pass by the table by extending a portion of it underneath the table top.

When 2D techniques indicate that there may be no collision-free path in a desired direction of travel, the robot 110 can switch to using 3D analysis techniques for local path planning. The 3D techniques perform a more fine-grained assessment of the feasibility of a path segment by comparing the 3D shapes of detected objects and the 3D shape of the robot 110 to detect a potential collision. The 3D analysis techniques can more accurately predict whether a collision will occur, thus identifying collision-free paths that were excluded by 2D analyses that did not account for the full 3D shapes of the robot 110 or nearby objects.

In some examples, the 3D analysis techniques can extend local path planning further by evaluating the ability of the robot 110 to navigate through a confined space in different configurations (e.g., with its arms elevated, or turned sideways). By evaluating different robot configurations, using 3D analysis techniques, the robot 110 may determine that the robot 110 can pass through a confined space in a particular configuration, allowing the robot 110 to navigate a route that the 2D techniques indicated was blocked.

Though 3D analysis techniques are more accurate, they may require considerably more computing resources than 2D analysis techniques. As a result, in some examples, the robot 110 implements 2D analysis techniques generally, switching only to 3D analyses when the 2D techniques fail to identify a collision-free route. Then, after the 3D analyses complete (e.g., after a collision-free path is identified), the robot 110 can switch back to 2D techniques for computational efficiency.

Local navigation includes local path planning, as described above, as well as motor command generation and further fine-grained collision avoidance analyses. To perform local navigation, the robot 110 includes a local navigation system 130, which implements a path planning module 140 and a navigation module 150. The path planning module 140 performs local path planning to determine collision-free path segments for the robot 110 using 2D and 3D analyses. Once the planning module 140 has determined a path, the navigation module 150 issues motor commands and provides local kinematic awareness and modeling for fine-grained collision avoidance. By switching between 2D and 3D analysis for local path planning, the robot 110 can ensure that existing collision-free paths are identified, while efficiently managing computing resources and load.

Referring still to FIG. 1, the robot 110 includes computing hardware as well as a locomotion system, such as motorized legs, wheels, or treads, enabling it to travel through a space. The actions and functions of the robot 110 are controlled by one or more embedded computer systems, which enable it to autonomously, or semi-autonomously, determine and perform actions, including navigation and locomotion. In the example of FIG. 1, the robot 110 is located in the room 120, which contains the table 122 and the plant 124 positioned such that there is a narrow space between them.

In some implementations, the robot 110 communicates with a server 170. The server 170 can be, for example, one or more computers, computer systems, server systems, or other computing devices. In some implementations, the server 170 is a cloud computing platform.

In FIG. 1, the robot 110 communicates with the server 170 through a network 105, which can include any combination of wired or wireless communication links. For example, the network 105 can include a local area network (LAN), a wide area network (WAN), Ethernet, a cellular data network, a Wi-Fi network, the Internet, or any other network topology that enables the exchange of data.

In system 100, the server 170 performs global path planning for the robot 110, generating a preferred global path for the robot based on a current task for the robot 110. In the example of FIG. 1, the robot's task is to open a window on the back wall of the room 120. Based on the robot's task, the server 170 determines a global path 126, which requires the robot 110 to travel from its current position at the front of the room 120 to the back wall of the room 120 by passing in between the table 122 and the plant 124. At regular intervals (e.g., at an approximately one Hz rate) or as needed, the server 170 updates the global path 126 based on the robot's current location and provides to the robot 110 the updated global path data 172, which describes the desired path 126 for the robot 110 to travel.

Based on the received global path data 172, the robot 110 navigates through the room 120 using its local navigation system 130. The local navigation system 130 performs various operations related to local path planning and locomotion that enable the robot 110 to move about the room 120 without colliding with other objects in the space.

The local navigation system 130 includes a path planning module 140 and a navigation module 150. The planning module 140 performs local path planning for the robot 110, determining collision-free path segments generally along the global path. After one or more collision-free path segments have been determined, the navigation module 150 generates motor commands 152 to produce robot motion and performs fine-grained kinematic modeling and sensing to ensure that the robot 110 avoids collisions when executing the motor commands 152.

The navigation system 130 is typically embedded as part of the robot 110, for example, as part of a computer system of the robot 110. The navigation system 130 can be implemented in any combination of software, firmware, and hardware, including one or more computer programs, general or special purpose central processing units (CPUs), field-programmable gate arrays (FPGAs), application-specific integrated circuits (ASICs) or other computational methods, systems, or devices.

The path planning module 140 includes a 2D planner 142, a 3D planner 144, and a mode select module 146. The mode select module 146 selects whether local path planning will be accomplished using 2D or 3D analysis techniques (e.g., by the 2D planner 142 or the 3D planner 144, respectively). In some examples, to conserve computing resources, the mode select module 146 selects the 2D planner 142 by default.

To determine the location of obstacles in the robot's local environment, the planning module 140 uses sensor data 162 received from sensors 160 of the robot 110. For example, the robot 110 may include various sensors 160, such as one or more cameras, radar systems, LIDAR, proximity sensors, or other detectors. The one or more cameras 160 can include monovision systems, as well as RGB-D devices, stereo cameras, or other systems that provide depth information. The sensors 160 generate data 162 that provides information about objects in the robot's local environment (e.g., within a few meters of the robot). The sensor data 162 can include raw or processed image data, video data, LIDAR signals, radar returns, proximity data, or other sensor data that provides information on the presence, location, size, or shape of obstacles near the robot 110.

Based on the received sensor data 162, the 2D planner 142 generates a local 2D occupancy grid that indicates the current location of obstacles or objects in the robot's local environment. The local occupancy grid may be similar to the global occupancy grid used for global path planning, but may have a smaller grid spacing (e.g., a local grid spacing of a few centimeters compared to a global grid spacing of 0.1 to 1 meter), enabling the robot 110 to determine more accurately the current occupancy of the space. Similar to the global occupancy grid, the local occupancy grid typically depicts a projection of an object or obstacle onto the plane of the floor. As a result, the local occupancy grid shows as occupied an area corresponding to the largest span of an object (e.g., for a table, the occupied area of the grid corresponds to the area of the table top).

In some examples, the planning module 140 may also use 2D floor plan data 174 to determine the location of objects in the robot's local environment. The floor plan data 174 can be provided by the server 170 and may be the same data used by the server 170 for global path planning. In some examples, the floor plan data 174 may be stored in a memory system of the robot 110. For example, the planning module 140 may use sensor data 162 to update or modify the floor plan data 174 to generate a local occupancy grid that reflects the current location of obstacles in the robot's local environment.

The planning module 140 also receives the global path data 172 describing the preferred path for the robot 110 to travel. In some examples, the global path data 172 is generated by the robot 110. In the example of FIG. 1, the global path data 172 is provided to the robot 110 by the server 170 and indicates a path 126 directing the robot 110 to move from the front to the back of the room 120 by traveling between the table 122 and the plant 124.

The planning module 140 also accesses robot data 136. The robot data 136 includes information describing the physical shape and size of the robot 110. For example, the robot data 136 may include one or more 2D profiles of the robot 110. The 2D profiles can be, for example, the outer dimensions of the robot 110 in one or more horizontal planes that are parallel to the floor (e.g., horizontal cross-sections of the robot 110). In some examples the robot data 136 include a maximum 2D profile and a minimum 2D profile. The maximum 2D profile can represent a maximum dimension, circumference, or span of the robot 110 that must be accommodated for the robot 110 to maneuver through a particular space. For example, the maximum profile may be a projection of the outer dimensions of the robot 110 onto a plane parallel to the floor that indicates the largest footprint of the robot 110, e.g., reflecting the maximum dimensions of the robot 110 in any horizontal plane along the height of the robot 110. In the example of FIG. 1, the maximum profile corresponds to a cross-section of the robot 110 across its base 111. The maximum profile may represent a maximum dimension across all potential poses or configurations of the robot 110, for example, showing the width of the arms when the arms are at their maximum outward extension. Alternatively, the maximum profile may represent the maximum dimensions for the current pose or configuration of the robot, e.g., based on the actual current position of the arms. If the robot 110 is carrying an object that extends away from the robot 110, the extent of the object can also be included in the current maximum profile of the robot 110 to avoid collision with the carried object.

Likewise, the minimum 2D profile can represent a minimum dimension, circumference, or span of the robot 110 that must be accommodated for the robot 110 to maneuver through a particular space. For example, the minimum profile can correspond to the horizontal cross-section of the robot 110 that has the smallest area or smallest dimensions. In the example of FIG. 1, the minimum 2D profile corresponds to a cross-section of the robot 110 across its trunk 112.

The robot data 136 also includes data describing the 3D shape of the robot. For example, the robot data 136 can include a 3D model of the robot, 2D profiles or cross-sections in various orientations (e.g., parallel and perpendicular to the floor), a listing of the robot's dimensions, or other data describing the robot's shape, size, and span in three dimensions. In some examples, the robot data 136 includes 2D or 3D shape data related to different configurations of the robot 110, for example, data describing the shape and span of the robot 110 when its arms are elevated or when it is configured in a different orientation (e.g., turned sideways).

Using the generated local occupancy grid and the robot data 136, the 2D planner 142 attempts to determine a series of collision-free path segments for the robot 110 to travel along the global path 126. The 2D planner 142 can predict a potential collision by tracing a maximum 2D profile of the robot along the route described by the global path data 172. The 2D planner 142 detects a potential collision at a location at which any portion of the maximum 2D profile intersects an occupied space of the local occupancy grid.

For example, based on the global path data 172, the 2D planner 142 can divide the portion of the global path near the robot's current location into shorter path segments. Starting at the current location of the robot 110, the 2D planner 142 can evaluate whether there would be a potential collision if the robot 110 moved along the next path segment. If the 2D planner 142 determines there are no potential collisions along the next path segment, it can evaluate a subsequent path segment for collision. The 2D planner 142 can continue to evaluate subsequent path segments until a predetermined series of segments are determined to be collision-free. After the 2D planner 142 identifies a series of segments that are collision-free, the planner 142 generates path data 148 describing the identified route.

If the 2D planner 142 determines that a path segment may result in a potential collision, it can attempt to determine an alternate, collision-free route that moves the robot 110 generally along the global path while avoiding the obstacle. For example, the 2D planner 142 may determine that the next path segment of the global path 126 may result in the robot 110 colliding with the table 122. The 2D planner 142 can then attempt to determine a path that navigates the robot 110 around the table 122 while avoiding any other obstacle in the room 120.

To determine an alternate, collision-free route, the 2D planner 142 can generate and evaluate multiple candidate path segments that move the robot 110 generally along the global path 126. For instance, the 2D planner 142 can generate candidate segments that deviate from the global path 126 by a particular angle (e.g., 10 degrees, 20 degrees, 30 degrees, etc.) For each candidate segment, the 2D planner 142 evaluates whether there would be a potential collision if the robot 110 moved along that segment. For any segment that the 2D planner 142 determines to be collision-free, the planner 142 can repeat the process, generating new candidate segments that start at the end point of the first segment and extend further in the general direction of the global path. The 2D planner 142 then evaluates the new candidate segments to identify a segment that is collision-free. The 2D planner 142 can repeat this process until it determines one or more collision-free paths around obstacles detected in the robot's local environment.

In some implementations, the generation of the collision-free route resembles a tree structure, where the 2D planner 142 prunes those routes or segments that result in a potential collision. If more than one collision-free route is identified, the 2D planner 142 can select a particular collision-free path based on any of various criteria (e.g., shortest distance, least deviation from the global path, most clearance from any detected obstacle or object). After the 2D planner 142 has selected a collision-free path, it generates path data 148 describing the selected path.

In some examples, the 2D planner 142 may fail to identify a collision-free route along the global path 126 (e.g., if a person or object has moved to complete block the path). However, in other examples, the 2D planner 142 may fail to identify a collision-free route even if a collision-free path does exist (e.g., in the previously-described scenario in which the robot can pass by the table only if a portion of the robot extends underneath the table top). If the 2D planner 142 failed to identify an existing collision-free path, the mode select module 146 can switch to the 3D planner 144, to implement 3D analysis techniques to identify the collision-free path.

Because 3D analysis techniques can be computationally expensive, the planning module 140 may prefer to implement them only if it determines that a collision-free path likely does exist. The planning module 140 can check whether a potential collision-free path exists by performing 2D analysis techniques using a minimum 2D profile of the robot. Similar to the analyses using the maximum profile, the 2D planner 142 can identify a potential collision-free path by searching for routes along which the minimum profile reaches the destination without intersecting any occupied grid spaces of the local occupancy grid.

Because the minimum 2D profile is usually smaller than the maximum 2D profile, the 2D planner 142 may identify a path that is collision-free when using the minimum profile, but which was not collision-free using the maximum profile (e.g., if the space between obstacles is smaller than the maximum profile, but larger than the minimum profile). If the 2D planner 142 identifies a collision-free path segment using the minimum profile, the mode select module 146 switches to the 3D planner 144. In some examples, the mode select module 146 may require the 2D planner 142 may to determine that multiple subsequent candidate path segments are collision-free using the minimum profile before it switches to the 3D planner.

The 3D planner 144 performs a more fine-grained analysis using 3D techniques to identify a collision-free route for the robot 110 that is generally along the global path 126. The 3D techniques implemented by the 3D planner 144 account for the 3D shape of the robot 110 (e.g., accounting for the differing dimensions of the robot 110 along its height), as well as the 3D shapes of the obstacles detected in the robot's local environment to more accurately evaluate the potential for collision along a candidate path segment.

To perform 3D analyses, the 3D planner 144 can generate a 3D profile of the robot 110 based on the robot data 136. The 3D robot profile can specify, for example, the span or circumference of the robot 110 at multiple, different heights from the floor or identify a 3D bounding box for the robot 110. The 3D profile can be based on a CAD or other model of the robot. In some implementations, the 3D planner 144 may generate a 3D profile that accounts for movable components of the robot 110, for instance, by generating a 3D profile that can be modified to reflect a particular configuration the robot 110 (e.g., with its arms elevated, turned sideways).

Based on the sensor data 162, the 3D planner 144 can also generate 3D profiles for one or more objects near the robot 110 in the direction of the candidate segment. Similar to the 3D robot profile, the 3D profiles of the objects can specify a span or circumference of the object at multiple different heights from the floor or identify a 3D bounding box for the object. In some examples, the 3D planner 144 may generate a point cloud representing the external surface of the one or more objects. In some examples, the 3D planner 144 may generate the 3D profile of the object based, at least in part, on data related to the type of object. For example, the robot 110 may identify a particular detected object as a table and use one or more CAD models of a table from a database to generate a 3D profile for an object.

The 3D planner 144 can then analyze the 3D profile of the robot 110 relative to the 3D profiles of any detected obstacles to determine whether movement of the robot 110 along the candidate path segment would lead to a potential collision with a nearby object. A potential collision would be indicated, for example, if a portion of the 3D profile of the robot 110 intersected a portion of the 3D profile of the object at any location along the segment. If the 3D planner 144 determines that the robot 110 can safely travel along the path segment without colliding with an obstacle, the planning module 140 can select the path segment, the mode select module 146 can switch back to the 2D planner 142, and the planning module 140 can plan the next path segment using 2D analysis techniques.

In some examples, the 3D planner 144 may repeat the analysis using 3D profiles that correspond to different configurations of the robot 110 (e.g., with robot arms elevated, with robot body turned sideways). For example, if the 3D planner 144 determines that the robot 110 cannot pass by a detected object in its typical configuration (e.g., arms by its side), the planner 144 may repeat the 3D analysis using a 3D shape corresponding to a different configuration of the robot. In some examples, the 3D planner 144 repeats the 3D analyses using 3D profiles corresponding to different robot configurations until a collision-free configuration is identified or until a predetermined set of configurations has been analyzed.

In some implementations, the planning module 140 may plan more than one sequential segment using 3D analysis techniques. In these examples, the 3D planner 144 can identify a collision-free path using a method similar to that implemented by the 2D planner 142, but using 3D analysis techniques to detect potential collisions. In brief, the 3D planner 144 can divide the local portion of the global path into shorter path segments then generate a candidate segment that generally moves the robot 110 along the global path 126. Using the 3D analysis techniques described above, the 3D planner 144 then determines whether moving the robot 110 along that segment would result in a potential collision. If the 3D planner 144 determines that a particular candidate segment would result in a potential collision, the 3D planner 144 evaluates a different candidate segment, perhaps varying the direction of the segment. The 3D planner 144 can also evaluate the same segment but with a different robot configuration (e.g., with arms elevated) or orientation (e.g., turned sideways). When the 3D planner 144 identifies a candidate segment and robot orientation that is collision-free, the 3D planner 142 can generate and evaluate a subsequent candidate segment that starts at the end point of the first segment.

Like the 2D planner, the 3D planner 144 can repeat this process until it determines one or more collision-free paths around one or more obstacles in the robot's local environment. If multiple collision-free paths are identified, the 3D planner 144 can select one path based on any of various criteria (e.g., shortest distance, least deviation from the global path, most clearance from any detected obstacle or object, most preferred robot configuration).

In some examples, neither the 2D planner 142, using maximum or minimum profiles) nor the 3D planner 144, may identify a collision-free path along the global path 126. In these examples, the planning module 140 may determine that no collision-free path exists.

After a collision-free path is identified and selected, the module 140 generates path data 148 describing the selected route. If the 3D planner 144 was used to select any segment of the path, the module 140 may also generate configuration data 149 describing the particular configuration of the robot 110 required to execute the path without collision (e.g., the robot 110 must elevate its arms for a portion of the path).

The planning module 140 provides the path data 148 and configuration data 149 to the navigation module 150. The navigation module 150 then generates motor commands 152 that are sent to the robot's motor control 180 to produce the locomotive forces necessary to move the robot 110 along the path described by the path data 148 and in the configuration described by the configuration data. The navigation module 150 also can use the sensor data 162 and other data to perform kinematic modeling or near-real-time collision avoidance to ensure that, as the robot 110 executes the motor commands 152 to follow the determined path, it does not collide with any object or person.

FIGS. 2A-2D are diagrams illustrating an example of local robot navigation using 2D and 3D path planning for the robot 110 of FIG. 1. In FIGS. 2A-2D, the robot 110 receives data indicating a preferred global path 126 that directs the robot 110 to move from the front of the room to the back of the room by traveling between the table 122 and the plant 124. While the gap between the top of the table 122 and the plant 124 is narrower than the robot's base, the robot 110 can travel through the gap without colliding with either the table 122 or the plant 124 by extending its robot base underneath of the table top and elevating its robot arms above the table top.

Figure 2A:
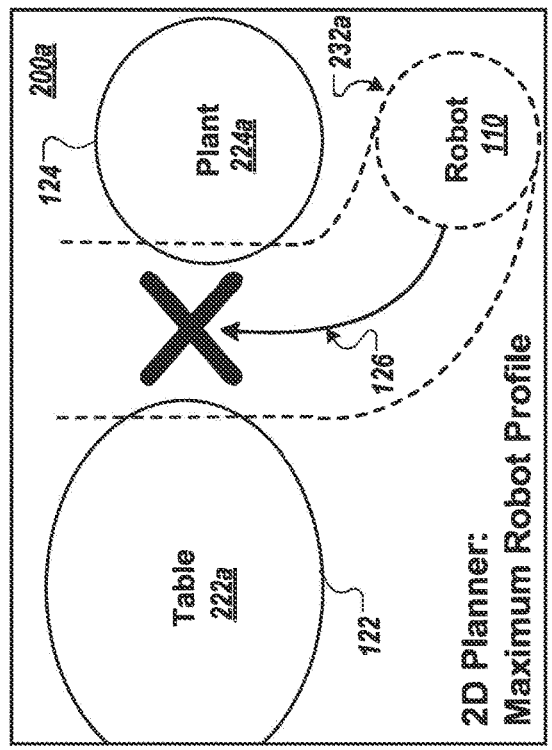
FIGS. 2A-2B are diagrams illustrating an example of 2D path planning.

FIG. 2A is a diagram illustrating an example 200*a* of 2D path planning using a maximum 2D robot profile. In FIG. 2A, based on sensor data received from sensors of the robot 110, the 2D planner generates a local 2D occupancy grid. The local occupancy grid includes areas 222 and 224 that are denoted as "occupied" by the table 122 and the plant 124, respectively.

Based on the robot data, the 2D planner generates a maximum 2D profile 232*a* of the robot 110. The maximum profile 232*a* corresponds to the widest span of the robot 110 that would pass through the space between the table 122 and the plan 124, e.g., the circumference of the base of the robot 110 in this example.

The 2D planner also receives global path data describing the preferred path 126, which directs the robot 110 to travel between the table 122 and the plan 124. Because the diameter of the maximum profile 232*a* is larger than the space between the areas 222 and 224 occupied by the table 122 and the plant 124, respectively, the 2D planner determines that there is no collision-free path. Without 3D path planning, the robot's attempt to locally navigate the preferred path 126 may end here, with a determination that there is no collision-free path, even though one does exist. Because the robot 110 also implements 3D path planning, it can switch to using 3D analysis techniques to identify the collision-free path.

To determine whether the robot 110 should switch to using 3D analysis techniques, the path planning module of the local navigation system first evaluates whether a collision-free path potentially exists using a minimum 2D profile. If the module does not identify a collision-free path using a minimum 2D profile, the system determines that there is no feasible collision-free path along the global path. However, if the module identifies a potential collision-free path using a minimum profile, the system then switches to using 3D analysis techniques.

Figure 2B:
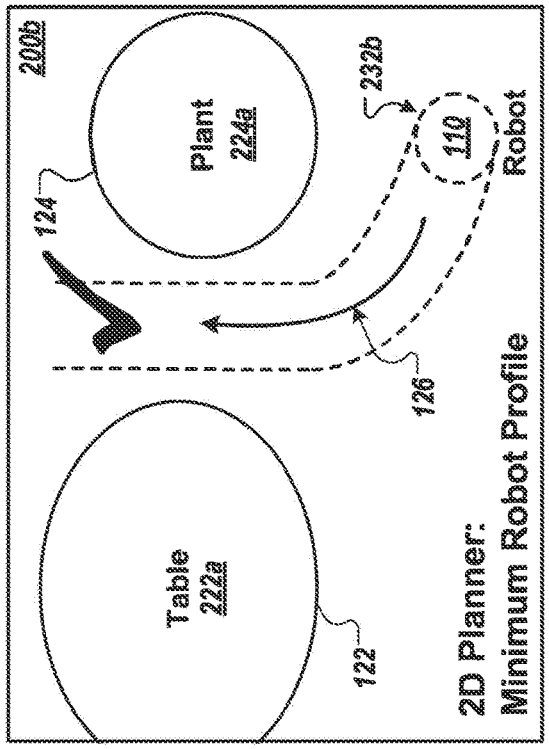

In example 200*b* of FIG. 2B, the robot 110 performs 2D path planning using a minimum 2D profile 232*b*. The 2D planner of the robot generates the minimum profile 232*b* of the robot 110 based on accessed robot data. In this example, the minimum profile 232*b* corresponds to the narrowest span of the robot 110 that would pass through the space between the table 122 and the plant 124 (e.g., the circumference of the robot's trunk).

The 2D planner evaluates the desired global path 126 using the minimum profile 232*b* and determines that, because the minimum profile 232*b* is smaller than the gap between the table 122 and the plant 224, there is potentially a collision-free route along the global path 126.

Figure 2C:
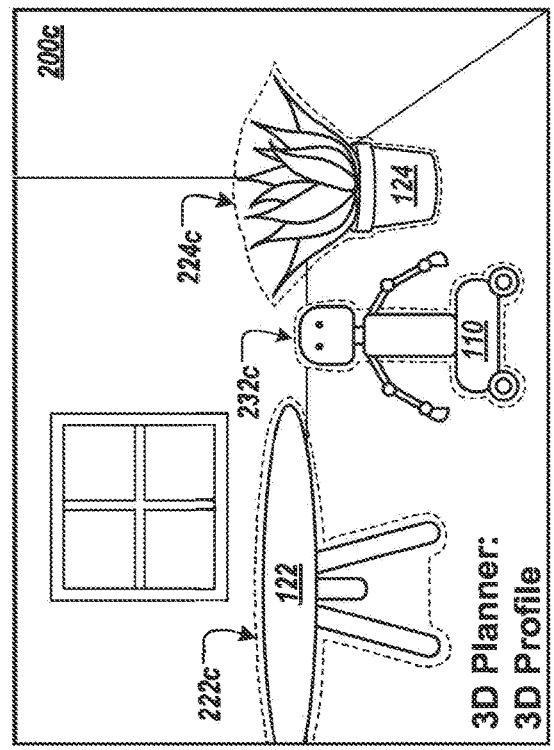
FIG. 2C is a diagram illustrating an example of 3D path planning.

Because the 2D planner determined that a potential collision-free path exists using the minimum profile 232*b*, the robot's path planning module switches to using 3D analysis techniques (e.g., the 3D planner) to identify the collision-free path. FIG. 2C is a diagram illustrating an example 200*c* of 3D path planning. In example 200*c*, the 3D planner of the robot generates a 3D profile 232*c* of the robot 110 based on accessed robot data. The 3D profile 232*c* includes a bounding box indicating the outer extent of the robot 110 in three dimensions. In the example of FIG. 2C, the bounding box does not include the robot's arms, as they are movable and can be adjusted as required.

The 3D planner also generates 3D profiles 222*c* and 224*c* of the table 122 and the plant 124, respectively. For example, the 3D planner can generate the profiles 222*c* and 224*c* based on image and depth data received from one or more RGB-D cameras of the robot 110.

Based on analyzing the 3D robot profile 232*c*, as well as the 3D profiles 222*c* and 224*c* of the table 122 and the plant 124, respectively, the 3D planner determines that the robot 110 can travel along the path between the table 122 and plant 124 without colliding with either if the robot 110 elevates its arms.

Based on the 2D and 3D path planning analyses, the robot's path planning module can select the collision-free path, and send data describing that path, as well as data indicating the required robot configuration, to the robot's navigation module.

Figure 2D:
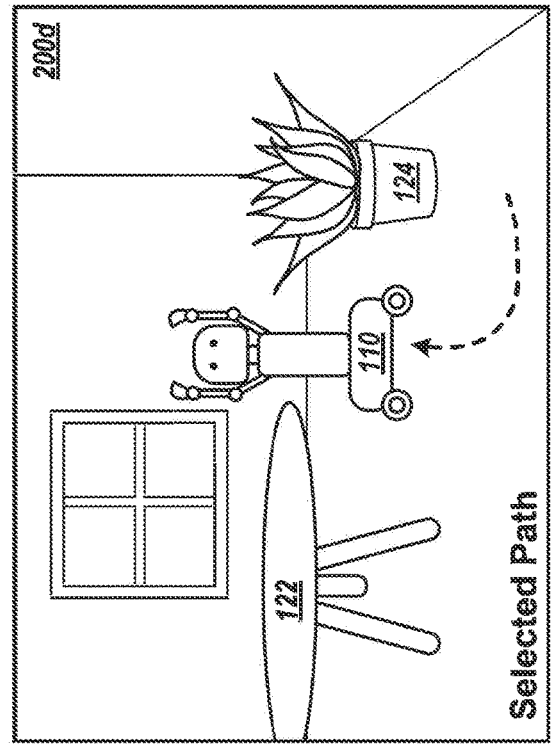
FIG. 2D is a diagram illustrating an example of local robot navigation using 3D path planning.

FIG. 2D is a diagram illustrating an example 200*d* of local robot navigation using the 2D and 3D path planning of FIGS. 2A-2C. In example 200*d*, based on the selected path and robot configuration (i.e., robot arms elevated) determined by the path planning module, the robot 110 successfully navigates the path between the table 122 and the plant 124.

Figure 3A:
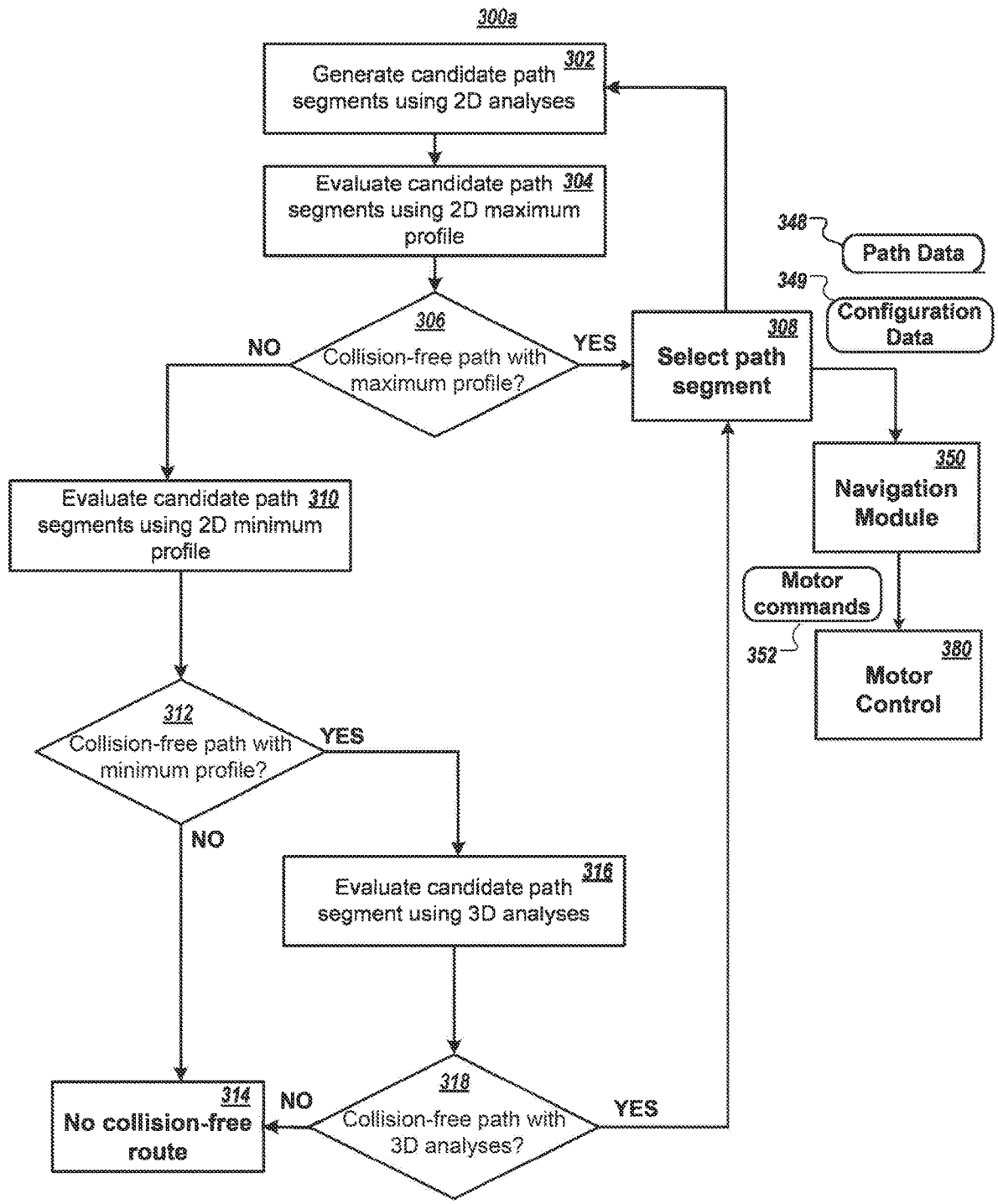
FIG. 3A is a flow diagram illustrating an example of a process for local robot navigation using 2D and 3D path planning.

FIG. 3A is a flow diagram illustrating an example of a process 300*a* for local robot navigation using 2D and 3D path planning. In process 300*a*, the robot's local navigation system first attempts to determine a collision-free route along the preferred global path using 2D analyses with a maximum 2D profile of the robot. If the system cannot identify a collision-free path, it then determines whether to perform 3D path analyses by first evaluating whether any potential collision-free path exists using 2D techniques with a minimum 2D profile of the robot. If the system identifies a collision-free path using the minimum profile, the system then performs 3D analyses to identify the collision-free path. If the system identifies the collision-free path using 3D analyses, it selects the identified path segment and sends data describing the path segment and robot configuration to the robot's motor control.

In process 300*a*, based on the preferred global path, the local navigation system's 2D planner first generates candidate path segments along the preferred path for the robot (302). For example, starting at the current location of the robot, the 2D planner may generate multiple candidate path segments that extend generally in the direction of the global path, but vary in angle relative to the path (e.g., vary by angular steps of 15 degrees). The lengths of the candidate path segments may be the same or may vary, but typically are short enough to remain within a nearby range of the robot (e.g., within a few meters).

The 2D planner then evaluates the candidate path segments using a maximum 2D profile of the robot to determine whether each segment results in a potential collision (304). The 2D planner can generate the maximum profile based on stored robot data that indicates the robot's physical size, shape, or dimensions. In some implementations, the 2D planner generates a local 2D occupancy grid based on sensor data that indicates the location of objects in the robot's local vicinity. The 2D planner detects a potential collision along a given candidate path segment if moving the robot along that segment would cause the maximum profile to intersect with an occupied space of the local occupancy grid.

Using the maximum profile and the local occupancy grid, the 2D planner evaluates the candidate path segments to determine whether any of the candidate path segments result in a collision-free path (306). If the 2D planner determines that one or more of the candidate path segments are collision-free, the 2D planner can select a path segment (308)

from among the collision-free segments then repeat the analysis (returning to step 302) to determine a subsequent path segment.

If the 2D planner determines that none of the candidate path segments are collision-free using the maximum profile, the system then determines whether to switch to 3D analyses by first evaluating the candidate path segments using a minimum 2D profile of the robot (310). For example, the 2D planner can generate the minimum profile of the robot based on stored robot data. The 2D planner can then use the generated local occupancy grid to determine whether a potential collision may occur were the robot to move along a given candidate path segment. Similar to the 2D analyses using the maximum profile, a potential collision is detected if moving the robot along the segment would cause the minimum profile to intersect with an occupied space of the local occupancy grid. In some implementations, the 2D planner may identify new candidate path segments (e.g., candidate path segments different from those evaluated using the maximum profile) to evaluate using the minimum 2D profile.

The 2D planner evaluates the candidate path segments to determine whether there is a collision-free path using the minimum 2D profile (312). If the 2D planner determines that none of the candidate path segments result in a collision-free route, the planner determines that there is no collision-free route along the preferred global path (314). In this case, the navigation system may return a message to the global path planning system (e.g., to a remote server) indicating that the preferred global path is not navigable. In some examples, the 2D planner may attempt to determine an alternate route, for instance, by generating and evaluating alternate candidate path segments that diverge more from the global path.

However, if the 2D planner determines that a particular candidate path segment is collision-free when evaluated using the minimum profile, the local navigation system switches to 3D path analyses. Using 3D analysis techniques, the 3D planner evaluates the particular candidate path segment to determine whether the segment is, in fact, collision-free (316). For example, as described previously, based on sensor data received from sensors of the robot (e.g., cameras, LIDAR, radar, etc.), the 3D planner can generate 3D profiles of objects detected in the robot's local environment. The 3D planner also generates a 3D profile of the robot in one or more configuration (e.g., with arms elevated, turned sideways). Based on the 3D profiles of the detected objects and the robot, the 3D planner determines whether the robot can travel along the particular candidate path segment without colliding with a detected object.

If the 3D planner determines that the particular candidate path segment is collision-free (318), it selects the path segment (308) and then continues planning the route by returning to step 302 to perform 2D path planning of the next path segment (e.g., a path segment that starts at the previous segments end point).

In some implementations, if the 3D planner determines that the particular candidate path segment results in a potential collision, the 3D planner may repeat step 316 for various robot configurations until a collision-free path is detected or until all of a predetermined set of configurations have been analyzed.

If the 3D planner determines that the robot cannot move along the candidate path segment without potentially colliding with an object, the planner determines that there is no collision-free route along the global path (314). As above, in this case, the navigation system may return a message to the global path planning system (e.g., a remote server) indicating that the preferred global path is not navigable or use local path planning to identify an alternate route that diverges more from the global path.

As noted above, once a collision-free candidate path segment has been selected (308), the local navigation system can continue path planning by repeating steps 302 through 318 as necessary. After a predetermined number of path segments have been selected, the system generates path data 348 describing the selected path and robot configuration data 349 describing the required robot configuration. The system provides the path data 348 and configuration data 349 to a navigation module 350, which generates motor commands 352 that are sent to the robot's motor control 380 to cause the robot to travel along the identified collision-free path.

Figure 3B:
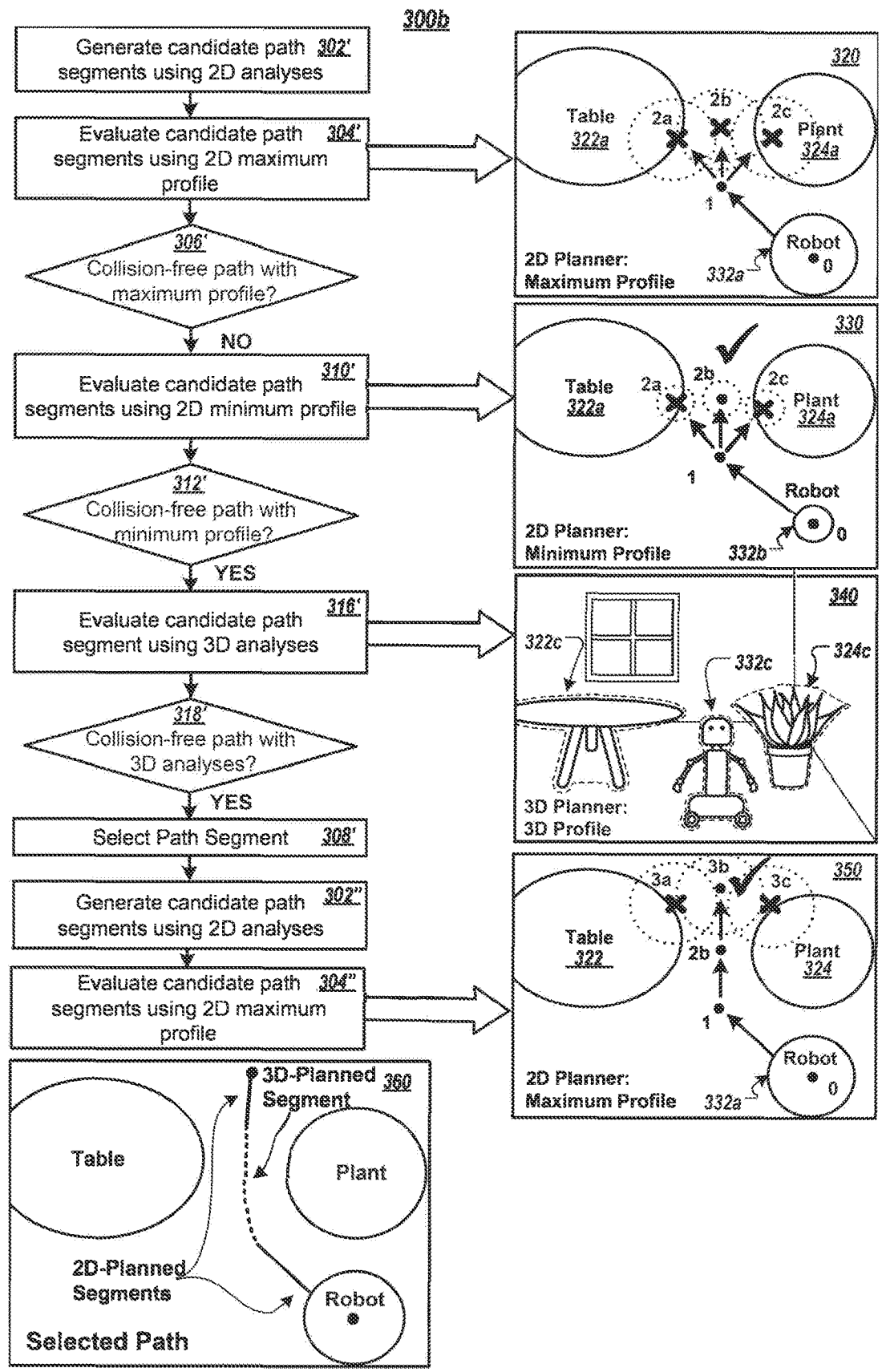
FIG. 3B is a diagram illustrating an example of local robot navigation using 2D and 3D path planning.

FIG. 3B is a diagram illustrating an example 300b of local robot navigation using the 2D and 3D path planning process 300a of FIG. 3A for a robot navigating along a preferred global path between a table and plant in a room, as in FIGS. 1 and 2A-2D.

In FIG. 3B the local navigation system of the robot has already determined a collision-free path segment from the starting point "0" to intermediate point "1" using 2D path planning with a maximum 2D profile. To determine the next path segment, in step 302' the 2D planner generates candidate path segments that would move the robot generally along the preferred global path. In example 300b, the 2D planner generates three candidate path segments, extending from point "1" to points "2a," "2b," and "2c," respectively, as shown in panel 320. The panel 320 also shows the locations of the table and plan, where areas 322 and 324 are designated as occupied in the robot's local 2D occupancy grid.

In step 304', the 2D planner uses a maximum 2D profile 332a of the robot to evaluate whether any of the candidate path segments are collision-free. Because the maximum profile 332a intersects with an occupied space of the local occupancy grid for all three of the candidate path segments, the 2D planner determines that none of the candidate path segments are collision-free path when evaluated using the maximum profile 332a (306').

Because the 2D planner did not identify a collision-free path using the maximum profile (306'), the 2D planner next determines whether a potential collision-free path exists by evaluating the candidate path segments using a minimum 2D profile 332b (310'). As shown in panel 330, the 2D planner evaluates each of the three candidate paths using the local 2D occupancy grid and determines that candidate segment from point "1" to point "2b" is collision-free when evaluated using the minimum profile 332b (312').

Because the 2D planner determines that there is a collision free path segment with the minimum 2D profile 332b, the local navigation system switches to using 3D analysis techniques to identify the collision-free path (316'). Based on sensor data, the 3D planner generates 3D profiles of the objects in the robot's local environment. In example 300b, the 3D planner generates 3D profiles 322c and 324c for the table and the plant, respectively, as shown in panel 340. Based on stored robot data, the 3D planner generates a 3D robot profile 332c corresponding to the 3D shape of the robot.

Using 3D analyses, the 3D planner evaluates the candidate path segment to determine whether there is a robot configuration that results in a collision-free route along the path segment (316'). In example 300b, the 3D planner determines that the robot can pass between the table and the plant without collision along the segment from point "1" to point "2b" if the robot elevates its arms (318').

Because the 3D planner identified a collision-free path using the 3D analyses (318'), the navigation system selects the identified path segment (from point "1" to point "2b") and continues path planning by reverting to 2D analyses using the maximum profile (302"). The 2D planner repeats step 302, generating three new candidate path segments from point "2b" to points "3a," "3b", and "3c," respectively. The 2D planner then evaluates each of the new candidate path segments using the maximum 2D profile 332a to determine whether a collision-free route can be identified (304"). As shown in panel 350, the 2D planner determines that segment "2b-3b" is collision-free using the maximum 2D profile. As a result, the system selects the path segment "2b-3b" then continues charting the robot course, according to process 300a, with the next path segment starting at point "3b."

Panel 360 of FIG. 3B shows the final path selected by the system, where the solid portions of the line indicates that the starting and ending segments of the path were determined using 2D path planning, while the dashed portion of the line indicates that the middle segment of the path, between the table and the plan, was determined using 3D path planning.

Figure 4:
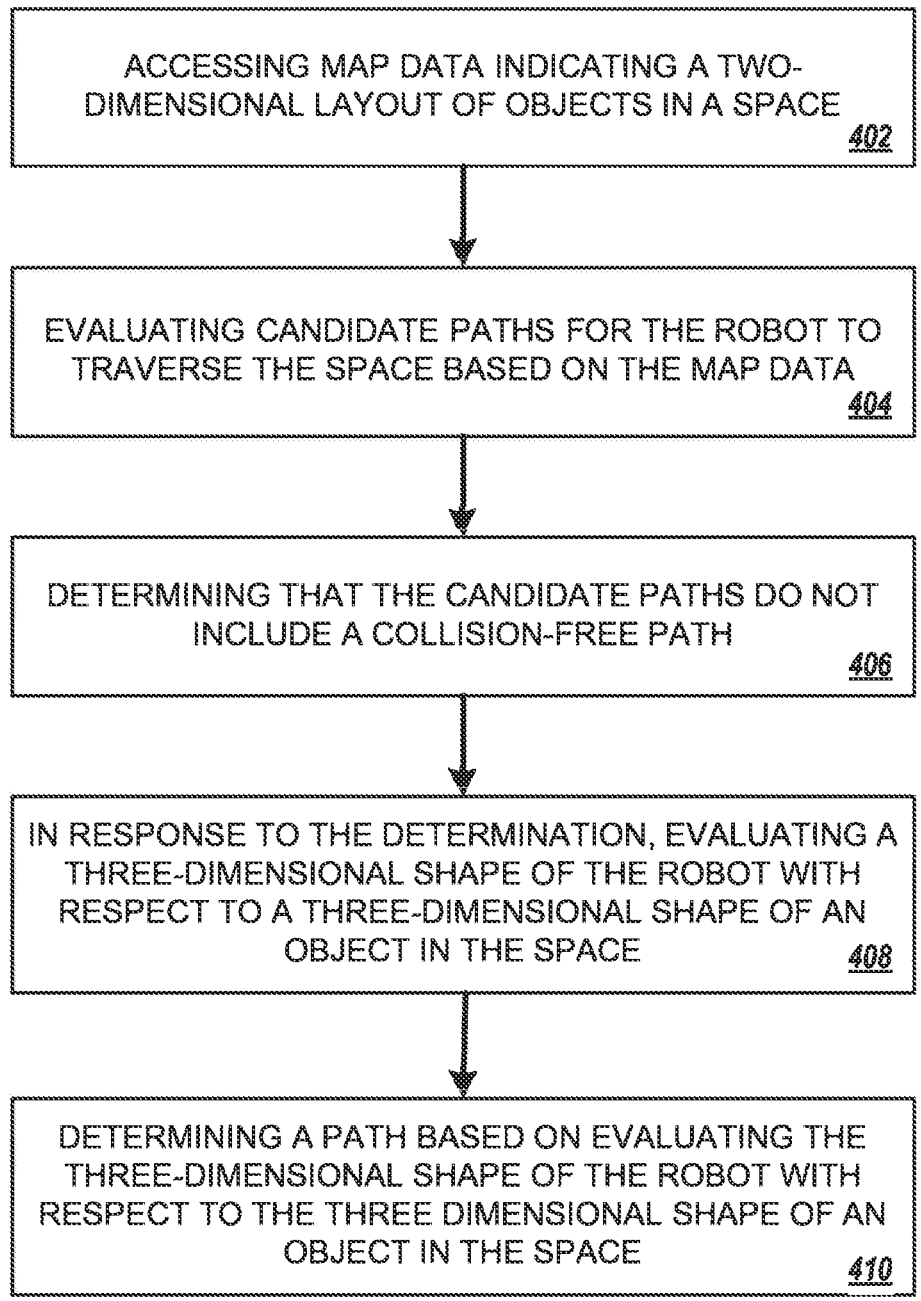
FIG. 4 is a flow diagram illustrating an example of a method for local robot navigation using 2D and 3D path planning.

FIG. 4 is a flow diagram illustrating an example of a method 400 for local robot navigation using 2D and 3D path planning. The method 400 can be performed by one or more computer systems, for example, a computer system of the robot 110. Briefly, the method 400 includes accessing, by the robot, map data indicating a 2D layout of objects in a space (402); evaluating candidate paths for the robot to traverse the space based on the map data (404); determining that the candidate paths do not include a collision-free path (406); in response to the determination, evaluating a 3D shape of the robot with respect to a 3D shape of an object in the space (408); and determining a path based on evaluating the 3D shape of the robot with respect to the three-dimensional shape of an object in the space (410).

In more detail, the method 400 includes accessing, by the robot, map data indicating a 2D layout of objects in a space (402). The map data can include, for example, a floor plan indicating the location of various objects and/or obstacles, including walls, barriers, barricades, furniture, or other objects that may impede the robot's movement. In some implementations, the map data can include one or more occupancy grids, where those grid spaces that correspond to objects or obstacles in the space are indicated. In some implementations, the robot receives the map data from a remote computer system, for instance, from a server over a communication network. In some implementation, the robot access the map data by retrieving the map data from a memory system of the robot.

The method also includes evaluating, by the robot, candidate paths for the robot to traverse the space based on the map data (404). For example, the robot may access a global path indicating a general direction or destination of the robot. Based on the map data, sensor data of the robot, or other data, the robot may determine a location of an object in the space and a 2D area occupied by the object. The robot may then generate a path segment for the robot to traverse, where the path segment is generally directed along the global path and the path segment does not intersect the area occupied by the object. In some implementations, the robot may generate more than one candidate path segments generally directed along the global path.

The method further includes determining, by the robot, that the candidate paths do not include a collision-free path across the space for a 2D profile of the robot (406). For example, the robot may access data indicating a 2D profile of the robot, where the 2D profile indicates a 2D shape of the robot. In some implementations, the 2D profile may be a minimum 2D profile of the robot, for example, a minimum span or circumference of the robot in a particular plane. The robot can generate a 2D area along a candidate path segment by tracing the 2D profile of the robot along a length of the segment. The robot can further determine that the candidate path segment is not collision-free by determining that the area along the candidate segment intersects an area occupied by an object. If none of the generated candidate path segments include a collision-free path, the robot can determine that the candidate paths do not include a collision-free path across the space for the particular 2D profile of the robot considered.

In response to determining that the candidate paths do not include a collision-free path across the space for the 2D profile of the robot, the robot can evaluate a 3D shape of the robot with respect to a 3D shape of an object in the space (408). For example, the robot may access data indicating a 3D shape of the robot, where the 3D shape can include spans or circumferences of the robot at multiple, different heights from the floor. In some cases, the 3D shape can indicate a 3D bounding box for the robot, or can be based on a 3D model of the robot (e.g., a CAD model). The 3D shape may correspond to a particular robot configuration (e.g., with its arms elevated, turned sideways). Similarly, the 3D shape of the object can include spans or circumferences of the object at multiple, different heights from the floor, a 3D bounding box for the object, or be based on a 3D model of the object. In some cases, the robot may determine the 3D shape of an object based on data from one or more sensors of the robot, for example, data from one or more cameras, LIDAR sensors, radar sensors, or other robot sensors. The robot can evaluate the 3D shape of the robot with respect to the 3D shape of the object to determine whether a generated path segment is collision-free.

The method also includes determining, by the robot, a path based on evaluating the 3D shape of the robot with respect to the 3D shape of an object in the space (410). For example, if, based on evaluating the 3D shape of the robot with respect to the 3D shape of one or more objects in the space, the robot determines that a particular candidate path is collision-free, it can select that candidate path for the robot to traverse.

In some implementations, the 3D shape of the robot may correspond to a particular configuration of the robot (e.g., with the robot arms to the sides). Based on evaluating the 3D shape corresponding to the particular robot configuration with respect to the 3D shape of an object in the space, the robot may determine that the candidate path would result in a collision between the robot and the object (e.g., the 3D shape of the robot intersects the 3D shape of the object at some point along the candidate path). The robot may then repeat the 3D analysis using a second 3D shape of the robot, for example, a 3D shape that corresponds to a second, different robot configuration (e.g., with the robot arms elevated) to determine whether a collision-free path exists. Based on evaluating the second 3D shape of the robot with respect to the 3D shape of the object, the robot may be able to determine a collision-free path for the robot.

The features described can be implemented in digital electronic circuitry, or in computer hardware, firmware, software, or in combinations of them. The techniques can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The machine-readable storage device may be a non-transitory machine-readable storage device. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touch-screen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. For example, a social networking platform, rather than an external application, may perform employment analysis and provide employment information to users of the social networking platform. Accordingly, other implementations are within the scope of the following claims.

What is claimed is:

1. A method performed by one or more computers, the method comprising:
   accessing data indicating a layout of objects in a space;
   determining that (i) a planning module for a robot fails to identify a potential collision-free path for the robot through the space based on a maximum profile for the robot and (ii) the planning module does identify at least one potential collision-free path for the robot through the space based on a minimum profile for the robot;
   based on the determination, evaluating at least one three-dimensional shape of the robot with respect to at least one three-dimensional shape of at least one object in the space;
   determining a path based on evaluating the at least one three-dimensional shape of the robot with respect to the at least one three-dimensional shape of the at least one object in the space; and
   causing the robot to move along the determined path.

2. The method of claim 1, wherein the maximum profile of the robot represents a maximum dimension across multiple potential poses or configurations of the robot.

3. The method of claim 1, wherein the minimum profile of the robot represents a minimum dimension across multiple potential poses or configurations of the robot.

4. The method of claim 1, wherein evaluating the at least one three-dimensional shape of the robot comprises comparing a shape of a region between obstacles in the space with the at least one three-dimensional shape of the robot.

5. The method of claim 1, wherein evaluating the at least one three-dimensional shape of the robot comprises evaluating at least one position of a movable component of the robot with respect to the rest of the robot.

6. The method of claim 5, wherein the movable component of the robot is an arm of the robot.

7. The method of claim 1, wherein evaluating the at least one three-dimensional shape of the robot comprises evaluating at least one orientation of the robot.

8. The method of claim 1, wherein accessing data indicating the layout comprises receiving map data from a server over a communication network.

9. A system comprising:
   one or more computers; and
   one or more computer-readable media storing instructions that, when executed by the one or more computers, cause the one or more computers to perform operations comprising:
   accessing data indicating a layout of objects in a space;
   determining that (i) a planning module for a robot fails to identify a potential collision-free path for the robot through the space based on a maximum profile for the robot and (ii) the planning module does identify at least one potential collision-free path for the robot through the space based on a minimum profile for the robot;
   based on the determination, evaluating at least one three-dimensional shape of the robot with respect to at least one three-dimensional shape of at least one object in the space;

determining a path based on evaluating the at least one three-dimensional shape of the robot with respect to the at least one three-dimensional shape of the at least one object in the space; and causing the robot to move along the determined path.

10. The system of claim 9, wherein the maximum profile of the robot represents a maximum dimension across multiple potential poses or configurations of the robot.

11. The system of claim 9, wherein the minimum profile of the robot represents a minimum dimension across multiple potential poses or configurations of the robot.

12. The system of claim 9, wherein evaluating the at least one three-dimensional shape of the robot comprises comparing a shape of a region between obstacles in the space with the at least one three-dimensional shape of the robot.

13. The system of claim 9, wherein evaluating the at least one three-dimensional shape of the robot comprises evaluating at least one position of a movable component of the robot with respect to the rest of the robot.

14. The system of claim 13, wherein the movable component of the robot is an arm of the robot.

15. The system of claim 9, wherein evaluating the at least one three-dimensional shape of the robot comprises evaluating at least one orientation of the robot.

16. One or more computer-readable media storing instructions that, when executed by the one or more computers, cause the one or more computers to perform operations comprising:

accessing data indicating a layout of objects in a space;

determining that (i) a planning module for a robot fails to identify a potential collision-free path for the robot through the space based on a maximum profile for the robot and (ii) the planning module does identify at least one potential collision-free path for the robot through the space based on a minimum profile for the robot;

based on the determination, evaluating at least one three-dimensional shape of the robot with respect to at least one three-dimensional shape of at least one object in the space;

determining a path based on evaluating the at least one three-dimensional shape of the robot with respect to the at least one three-dimensional shape of the at least one object in the space; and causing the robot to move along the determined path.

17. The one or more computer-readable media of claim 16, wherein the maximum profile of the robot represents a maximum dimension across multiple potential poses or configurations of the robot.

18. The one or more computer-readable media of claim 16, wherein the minimum profile of the robot represents a minimum dimension across multiple potential poses or configurations of the robot.

19. The one or more computer-readable media of claim 16, wherein evaluating the at least one three-dimensional shape of the robot comprises comparing a shape of a region between obstacles in the space with the at least one three-dimensional shape of the robot.

20. The one or more computer-readable media of claim 16, wherein evaluating the at least one three-dimensional shape of the robot comprises evaluating at least one position of a movable component of the robot with respect to the rest of the robot.

* * * * *